UNITED STATES PATENT OFFICE.

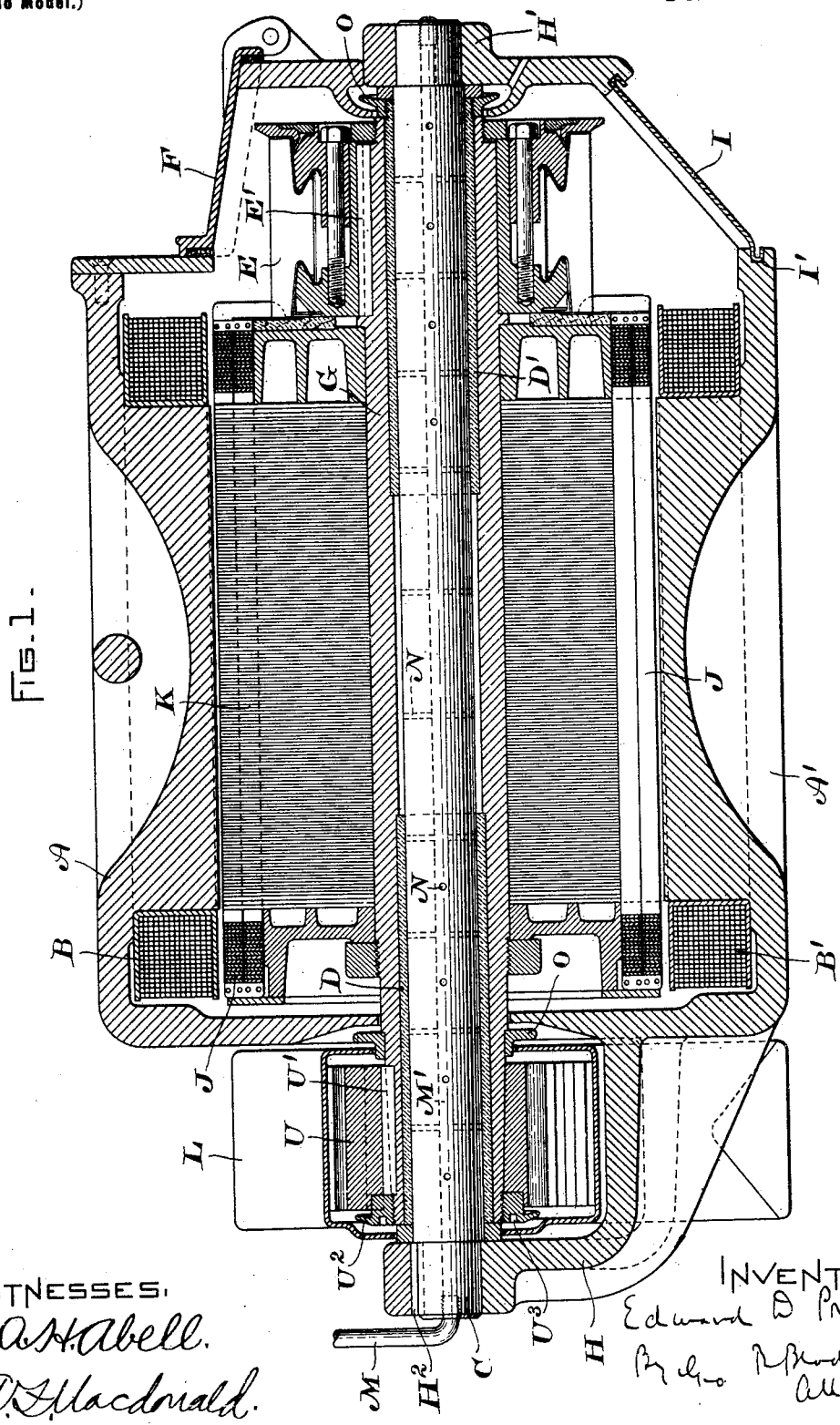

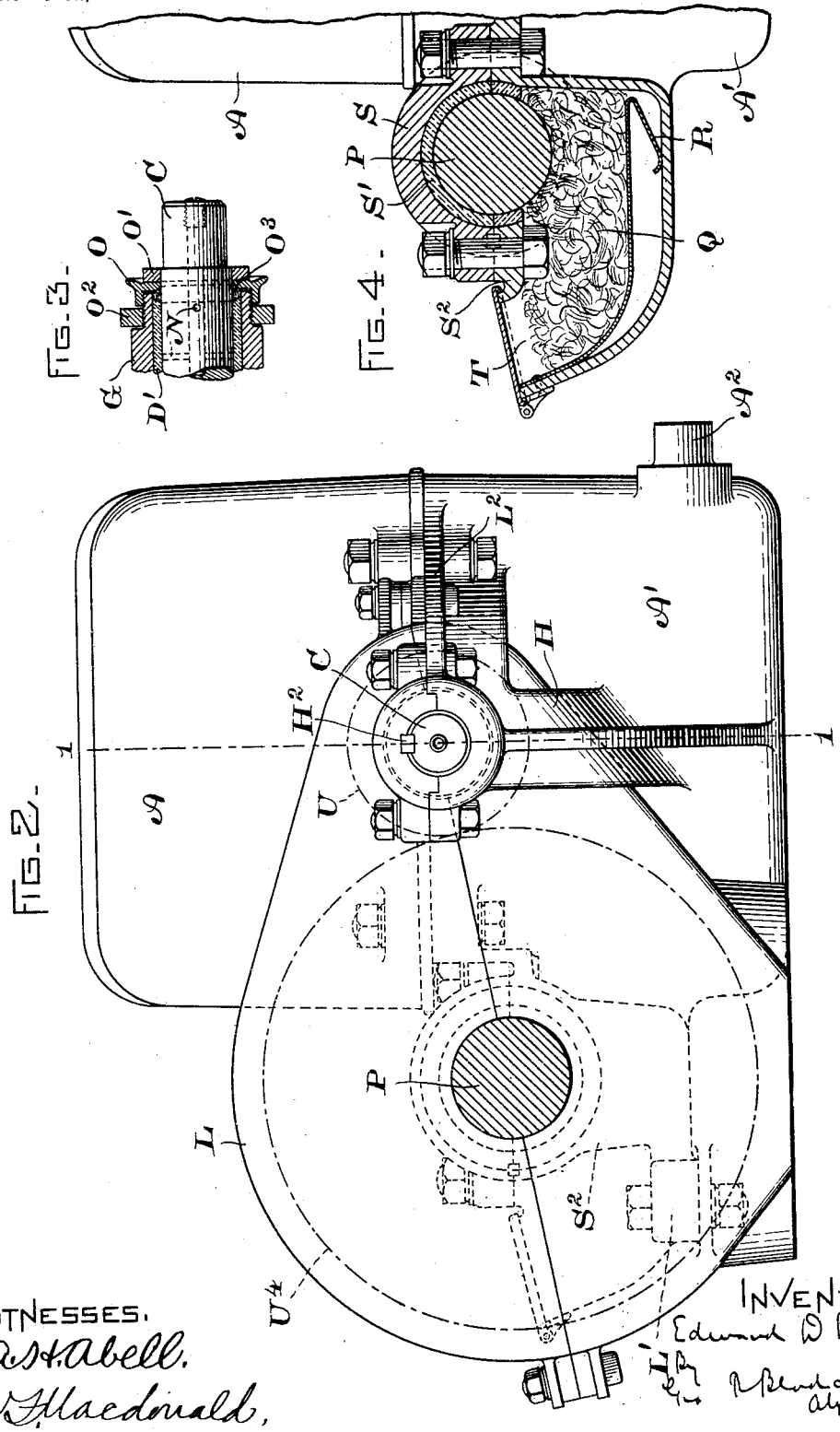

EDWARD D. PRIEST, OF SCHENECTADY, NEW YORK, ASSIGNOR TO THE GENERAL ELECTRIC COMPANY, OF NEW YORK.

ELECTRIC MOTOR FOR RAILWAYS.

SPECIFICATION forming part of Letters Patent No. 664,969, dated January 1, 1901.

Application filed January 30, 1897. Serial No. 621,298. (No model.)

*To all whom it may concern:*

Be it known that I, EDWARD D. PRIEST, a citizen of the United States, residing at Schenectady, in the county of Schenectady, State of New York, have invented certain new and useful Improvements in Electric Motors, (Case No. 505,) of which the following is a specification.

The present invention relates to electric motors, and more particularly to those employed for propelling vehicles upon tramways.

The invention has for one of its objects to increase the effective length of the armature-conductors without increasing the external dimensions of the motor.

A further object of my invention is to provide bearings which are so inclosed as to be practically dust-proof.

The invention further relates to certain features of construction more fully pointed out hereinafter.

In the accompanying drawings, which illustrate an embodiment of my invention, Figure 1 is a longitudinal section of a motor taken on the line 1 1 of Fig. 2. Fig. 2 is a side elevation of the same, and Figs. 3 and 4 are details of construction.

The field-magnet frame is divided on a line with the center of the armature into two parts A and A'. These are provided with energizing-coils B B', situated above and below the armature. Extending rearwardly from the lower half of the field-magnet A' are lugs $S^2$, Figs. 2 and 4, forming axle-bearings. On the front of the lower half is a lug $A^2$, to which is secured means for hanging the front end of the motor.

The armature may be made in any of the well-known ways. The one shown has a body of laminated iron K, which is slotted to receive the armature-conductors J and is provided with heavy end plates for holding the laminæ together. I substitute for the usual rotating armature-shaft a stationary shaft and mount the armature upon a sleeve free to turn upon the stationary shaft. The stationary shaft C is mounted in lugs H H', which form a part of the lower field-magnet frame A'. The shaft C is prevented from rotating by a key $H^2$. The lugs H H' are provided with removable caps, so that the shaft C may be removed when desired.

On the right-hand end of the sleeve G is a commutator E of any desired construction, and it is secured to the sleeve G by the key E'.

Between the stationary shaft C and the sleeve G are bearings D and D'. These are so arranged that they rotate with the sleeve G. Oil is supplied to the bearings by means of the holes N N, which connect with the oil-tube M through the hole M', (shown in dotted lines in Fig. 1,) extending through the center of the stationary shaft C. The length of the bearings D D' may be increased without increasing the external dimensions of the motor, and by this construction the liability of heating due to insufficient bearing-surfaces is reduced to a minimum. The bearings D and D' being entirely inclosed are protected against dust and dirt, which materially increases the life of the linings and renders renewals less frequent, thereby decreasing the cost of maintenance.

To prevent the oil from working into the armature-winding and commutator, oil-throwers O O are provided, so arranged that any oil working to the outer end of the bearings is thrown by them either to the outside of the motor-frame or into a suitable pocket or receptacle.

A pinion is mounted on the left-hand end of the sleeve G, which is slightly tapered and secured thereto by a key U'. A nut $U^2$, having spanner-holes $U^3$, is employed for forcing the pinion upon the sleeve G and retaining it in place. The pinion U meshes with a spur-gear $U^4$, mounted on the car-axle P. Inclosing these gears is a casing L, which is provided with lugs for securing it to the magnet-frame. The pinion U being supported by the lug on the outside, the strain on the sleeve G is reduced to a minimum, and there is little or no tendency for the sleeve and stationary shaft C to twist out of line. This is a decided advantage over the ordinary construction.

It will be seen that the bearing D' on the commutator end of the armature is entirely within the field-magnet frame and also that portion of the bearing D which supports the armature at the pinion end. By my invention I am enabled to increase the capacity of the motors by increasing the length of armature-conductors without increasing the length of the stationary shaft C.

In the construction of railway-motors intended for use on trucks where the standard gage of four feet eight inches is employed, with thirty-three-inch driving-wheels, the external dimensions of the machine are necessarily limited, and to increase the capacity of the motors without increasing their external dimensions becomes a matter of importance. In motors having magnets which more or less inclose the armature itself it is customary to permit a certain portion of the armature-shaft bearings to project within the casing, the amount of such projection usually depending upon the extent of bearing-surface necessary to permit the cool running of the armature. This usually amounts to about one-half of the length of the bearings. In the present instance I have done away with this objection, and by so doing am able to greatly increase the length of the armature-conductors. For example, a standard motor of the same internal and external dimensions as the one shown in the drawings permits of a certain length of armature-bars. This length is determined largely by the amount of space occupied by the bearings. The same motor when modified to the extent of changing the bearings, as shown in the drawings, permits the length of the field-poles of the armature-conductors to be increased about twenty-five per cent.

At the right-hand side of the motor, situated over the commutator E, is a cover F, mounted on a hinge and arranged to permit inspection of the commutator and brushes. Situated under the commutator is a cover I, made of a thin sheet of metal having its outer edges bent over to form spring-clamps, which engage with grooves I', cut in the field-magnet frame, the spring-clamps retaining the cover in position. The cover is removed by sliding it in a direction parallel to the length of the motor.

In Fig. 3 I have shown a detail view of my preferred oil-thrower. The stationary shaft C is provided with a center oil-hole, and leading therefrom are oil-holes N, which distribute oil to the bearing D'. The outer end of the sleeve G is provided with a screw-threaded portion, upon which is mounted the collar $O^2$. The oil-thrower O is also screw-threaded to the sleeve G, and between the oil-thrower and the bearing D' is a packing $O^3$ of any suitable material, its object being to prevent the oil from working from the bearing D' to the exterior of the motor. Situated on the outside of the oil-thrower O is a collar O', shrunk on or otherwise secured to the stationary shaft C.

Referring more particularly to Figs. 2 and 4, the motor is supported by the lower portion A' of the field-magnet. This permits the upper half A to be removed for the purpose of inspecting the armature without unhanging the motor from the truck. Mounted upon the axle P is a spur-gear $U^4$, indicated in broken and dotted lines. This meshes with a pinion U, which is mounted on the sleeve G, carrying the armature. Surrounding the gears is a casing L, which is supported at the axle end by a lug L', forming a part of the lower field-magnet casting A', and at the armature end by a lug $L^2$, which also forms a part of the lower field-magnet.

Referring to Fig. 4, the construction of the axle-bearing will be seen. The lug $S^2$ is integral with the lower field-magnet A' and forms the lower half of the bearing. Secured to the lower half of the bearing by bolts is a bearing-cap S, and between it and the shaft P is a lining S'. Extending rearwardly from the lug $S^2$ is an oil-box T, having a suitable cover permitting the insertion of oil and waste Q. A portion of the axle-lining S' is cut away, so that the waste Q, which is saturated with oil, may engage directly with the axle P. To keep the waste in engagement with the axle, a spring R is employed.

What I claim as new, and desire to secure by Letters Patent of the United States, is—

1. In an electric motor, the combination of a field-magnet frame divided into two substantially equal parts, a coil for energizing the pole-piece of each part of the field-magnet, a stationary shaft mounted in one of the parts of the magnet-frame, a rotating sleeve carrying the armature and commutator, and a bearing between the sleeve and the stationary shaft which is wholly inclosed by the magnet-frame.

2. In an electric motor, the combination of a field-magnet frame divided into two substantially equal parts, coils for energizing the field-magnet, a stationary shaft mounted in the lower half of the field-magnet frame, a sleeve carrying an armature and pinion rotatable about the stationary shaft, and a lug formed integral with the lower half of the magnet extending outside of the pinion and forming a support for the stationary shaft.

3. In an electric railway-motor, the combination of a field-magnet frame, an armature, a stationary shaft, a sleeve carrying the armature mounted upon the stationary shaft, a bearing between the sleeve and shaft, which is inclosed by the side portions of the field-magnet frame, a main oil-passage extending through the shaft, and holes extending at an angle thereto for supplying oil to the bearings.

4. In an electric railway-motor, the combination of a divided field-magnet sleeved upon the car-axle and arranged to completely inclose and protect the armature, a stationary shaft, a sleeve surrounding the shaft which is also inclosed by the field-magnet, a pinion rigidly secured to the sleeve, a bearing between the stationary shaft and the sleeve which is also inclosed by the magnet, and a gear mounted on the car-axle engaging with the pinion.

5. In an electric railway-motor, the combination of a field-magnet frame divided into two parts, lugs formed integral with the lower part, a stationary shaft mounted in the lugs, a sleeve mounted on the stationary shaft for rotary movement, a bearing or bearings for the sleeve, and a pinion mounted on the sleeve between one of the lugs and the side of the magnet-frame, the said frame extending between it and the armature.

In witness whereof I have hereunto set my hand this 27th day of January, 1897.

EDWARD D. PRIEST.

Witnesses:
B. B. HULL,
A. F. MACDONALD.